(12) United States Patent
Park et al.

(10) Patent No.: US 12,481,773 B2
(45) Date of Patent: Nov. 25, 2025

(54) DATE OFFSET IN DOCUMENT

(71) Applicant: TrialAssure Inc., Canton, MI (US)

(72) Inventors: Jin Seuk Park, Canton, MI (US);
Zachary Thomas Weingarden, Grosse Pointe Woods, MI (US)

(73) Assignee: TrialAssure Inc., Canton, MI (US)

( * ) Notice: Subject to any disclaimer, the term of this patent is extended or adjusted under 35 U.S.C. 154(b) by 241 days.

(21) Appl. No.: 18/059,629

(22) Filed: Nov. 29, 2022

(65) Prior Publication Data

US 2023/0195916 A1    Jun. 22, 2023

Related U.S. Application Data

(60) Provisional application No. 63/290,856, filed on Dec. 17, 2021.

(51) Int. Cl.
*G06F 21/62* (2013.01)

(52) U.S. Cl.
CPC ............................ *G06F 21/6209* (2013.01)

(58) Field of Classification Search
CPC .................................... G06F 21/62–629
See application file for complete search history.

(56) References Cited

U.S. PATENT DOCUMENTS

| | | | | |
|---|---|---|---|---|
| 9,507,862 | B2 * | 11/2016 | Chennai | G06F 16/951 |
| 9,773,124 | B2 * | 9/2017 | El Emam | G06F 21/6227 |
| 11,347,891 | B2 * | 5/2022 | Raphael | G06F 21/602 |
| 2008/0240425 | A1 * | 10/2008 | Rosales | G06F 21/6254 |
| | | | | 380/28 |
| 2016/0342812 | A1 * | 11/2016 | Lynch | H04L 63/0421 |
| 2020/0065524 | A1 * | 2/2020 | Carlson | G06F 16/2477 |

FOREIGN PATENT DOCUMENTS

CA      2870930      5/2015

OTHER PUBLICATIONS

El Emam, Khaled, and Kald Abdallah. "De-identifying data in clinical trials." (2015). (Year: 2015).*

Stefan Fenz, Johannes Heurix, Thomas Neubauer & Antonio Rella (2014) De-identification of unstructured paper-based health records for privacy-preserving secondary use, Journal of Medical Engineering & Technology, 38:5, 260-268, DOI: 10.3109/03091902.2014.913080 (Year: 2014).*

* cited by examiner

*Primary Examiner* — Madhuri R Herzog
(74) *Attorney, Agent, or Firm* — TILLMAN WRIGHT, PLLC; Neal Wolgin; David R. Higgins

(57) ABSTRACT

A method of anonymizing a digital document includes: receiving a digital source document containing text including at least one date; referring to a user-defined rule set, wherein the rule set includes at least a date offset function; and applying modifications to the digital source document according to the user-defined rule set, so as to anonymize the digital source document, the modifications including changing the least one date to a different date in accordance with the date offset function; and saving the modified digital source document as an output document.

17 Claims, 6 Drawing Sheets

ABC-123 is a 45-year-old male, height 183 cm weight 80 kg. He was first examined on Feb. 1, 2018 1/1/18. The subject was selected for participation in the clinical trial for the drug. He was administered the trial drug (first dose) on 2/15/18 1/15/18. Follow up visits occurred on March 1, 2018 1/29/18 and March 15, 2018 2/12/18. The subject reported mild fatigue but no other side effects. The second dose was administered on 3/31/2018 2/28/18. Further follow up visits occurred on April 15, 2018 3/15/18 and 4/30/2018 3/30/18. No further side effects were noted.

ABC-456 is a 48-year-old female, height 152 cm weight 65 kg. She was first examined on Feb. 3, 2018 1/1/18. The subject was selected for participation in the clinical trial for the drug. She was administered the trial drug (first dose) on 2/13/18 1/11/18. Follow up visits occurred on March 3, 2018 1/29/18 and March 17, 2018 2/12/18. The subject reported injection site soreness but no other side effects. The second dose was administered on 3/28/2018 2/23/18. Further follow up visits occurred on April 12, 2018 3/10/18 and 4/29/2018 3/27/18. No further side effects were noted.

ABC-123 is a 45-year-old male, height 183 cm weight 80 kg. He was first examined on Feb. 1, 2018. The subject was selected for participation in the clinical trial for the drug. He was administered the trial drug (first dose) on 2/15/18. Follow up visits occurred on March 1, 2018 and March 15, 2018. The subject reported mild fatigue but no other side effects. The second dose was administered on 3/31/2018. Further follow up visits occurred on April 15, 2018 and 4/30/2018. No further side effects were noted.

ABC-456 is a 48-year-old female, height 152 cm weight 65 kg. She was first examined on Feb. 3, 2018. The subject was selected for participation in the clinical trial for the drug. She was administered the trial drug (first dose) on 2/13/18. Follow up visits occurred on March 3, 2018 and March 17, 2018. The subject reported injection site soreness but no other side effects. The second dose was administered on 3/28/2018. Further follow up visits occurred on April 12, 2018 and 4/29/2018. No further side effects were noted.

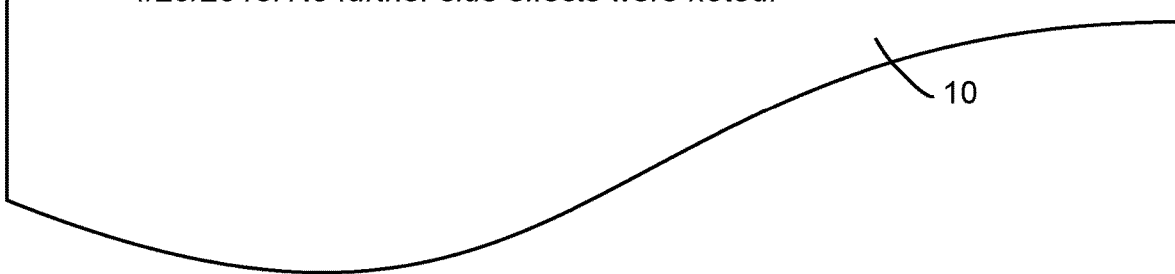

FIG. 1

ABC-123 is a 45-year-old male, height 183 cm weight 80 kg. He was first examined on ~~Feb. 1, 2018~~ 1/1/18. The subject was selected for participation in the clinical trial for the drug. He was administered the trial drug (first dose) on ~~2/15/18~~ 1/15/18. Follow up visits occurred on ~~March 1, 2018~~ 1/29/18 and ~~March 15, 2018~~ 2/12/18. The subject reported mild fatigue but no other side effects. The second dose was administered on ~~3/31/2018~~ 2/28/18. Further follow up visits occurred on ~~April 15, 2018~~ 3/15/18 and ~~4/30/2018~~ 3/30/18. No further side effects were noted.

ABC-456 is a 48-year-old female, height 152 cm weight 65 kg. She was first examined on ~~Feb. 3, 2018~~ 1/1/18. The subject was selected for participation in the clinical trial for the drug. She was administered the trial drug (first dose) on ~~2/13/18~~ 1/11/18. Follow up visits occurred on ~~March 3, 2018~~ 1/29/18 and ~~March 17, 2018~~ 2/12/18. The subject reported injection site soreness but no other side effects. The second dose was administered on ~~3/28/2018~~ 2/23/18. Further follow up visits occurred on ~~April 12, 2018~~ 3/10/18 and ~~4/29/2018~~ 3/27/18. No further side effects were noted.

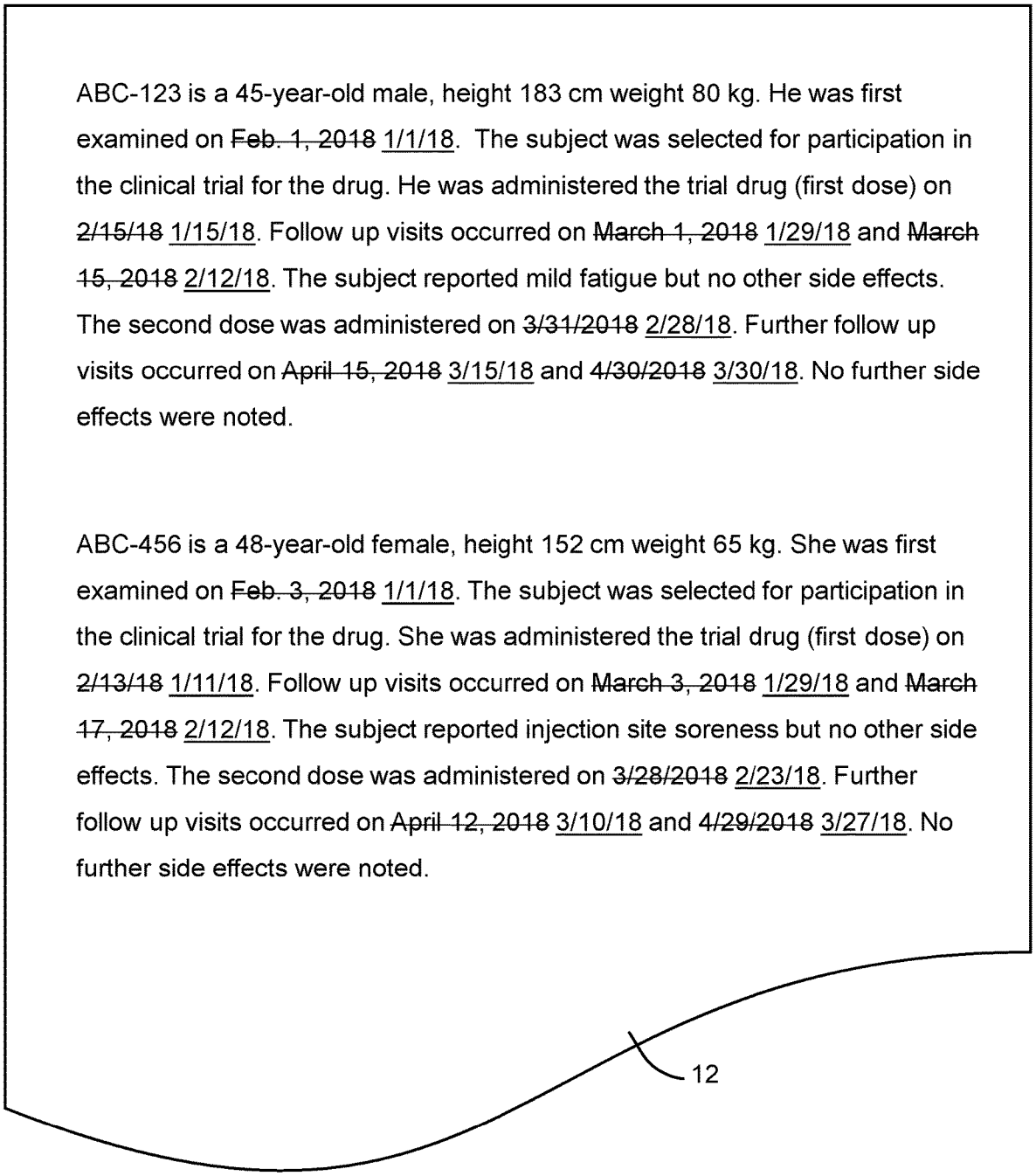

FIG. 3

ABC-123 is a 45-year-old male, height 183 cm weight 80 kg. He was first examined on 1/1/18. The subject was selected for participation in the clinical trial for the drug. He was administered the trial drug (first dose) on 1/15/18. Follow up visits occurred on 1/29/18 and 2/12/18. The subject reported mild fatigue but no other side effects. The second dose was administered on 2/28/18. Further follow up visits occurred on 3/15/18 and 3/30/18. No further side effects were noted.

ABC-456 is a 48-year-old female, height 152 cm weight 65 kg. She was first examined on 1/1/18. The subject was selected for participation in the clinical trial for the drug. She was administered the trial drug (first dose) on 1/11/18. Follow up visits occurred on 1/29/18 and 2/12/18. The subject reported injection site soreness but no other side effects. The second dose was administered on 2/23/18. Further follow up visits occurred on 3/10/18 and 3/27/18. No further side effects were noted.

Anchor Date: 1/1/18

Subject #1
Subject ID: ABC-123
First Collected Date: Feb. 1, 2018
Offset Value: 31

| Initial Date | Anonymized Date |
|---|---|
| Feb 1, 2018 | 1/1/18 |
| 2/15/18 | 1/15/18 |
| March 1, 2018 | 1/29/18 |
| March 15, 2018 | 2/12/18 |
| 3/31/2018 | 2/28/18 |
| April 15, 2018 | 3/15/18 |
| 4/30/2018 | 3/30/18 |

Subject #2
Subject ID: ABC-456
First Collected Date: Feb. 3, 2018
Offset Value: 33

| Initial Date | Anonymized Date |
|---|---|
| Feb 3, 2018 | 1/1/18 |
| 2/13/18 | 1/11/18 |
| March 3, 2018 | 1/29/18 |
| March 17, 2018 | 2/12/18 |
| 3/28/2018 | 2/23/18 |
| April 12, 2018 | 3/10/18 |
| 4/29/2018 | 3/27/18 |

FIG. 6

DATE OFFSET IN DOCUMENT

BACKGROUND OF THE INVENTION

This invention relates generally to digital document handling and more particularly to automated document anonymization.

In medical research and other similar fields, information about human subjects is stored in numerous types of documents. These documents often include personally-identifiable information about the subjects.

To prevent researcher bias, protect the privacy of the subjects, and comply with applicable statues and regulations, documents are often redacted by removing personally identifiable information such as names, addresses, race, age, gender, or geographic locations.

Even with such information removed, date information may be present which allows a subject to be identified. For example, a subject may be physically examined on several spaced-apart dates which collectively form a unique pattern.

Instead of redaction, it would be desirable to obfuscate or anonymize such dates; however this can be challenging because the information is typically stored in a textual form which does not identify the relationship between dates and specific subjects. Furthermore, the length of time between two dates is usually important to the reader, and can often be a matter of a few days. Therefore simply altering dates between two different formats (e.g., from MM/DD/YYYY format to MM/YYYY) can significantly reduce the utility of the information.

BRIEF SUMMARY OF THE INVENTION

This problem is addressed by a method in which a software application associates dates with subjects, calculates an offset value for each subject, in the written text, and transforms date values.

According to one aspect of the technology described herein, a method of anonymizing a digital document includes: receiving a digital source document containing text including at least one date; referring to a user-defined rule set, wherein the rule set includes at least a date offset function; and applying modifications to the digital source document according to the user-defined rule set, so as to anonymize the digital source document, the modifications including changing the least one date to a different date in accordance with the date offset function; and saving the modified source document as an output document.

According to another aspect of the technology described herein, a computer system for processing documents includes: a memory; and a processor coupled to the memory and operative to perform the operations of: receiving a digital source document containing text including at least one date; referring to a user-defined rule set, wherein the rule set includes at least a date offset function; and applying modifications to the digital source document according to the user-defined rule set, so as to anonymize the digital source document, the modifications including changing the least one date to a different date in accordance with the date offset function; and saving the modified source document as an output document.

According to another aspect of the technology described herein, a computer program product includes one or more non-transitory computer readable media having stored thereon a plurality of instructions that, when executed by one or more processors of a system, causes the one or more processors to carry out a method including: receiving a digital source document containing text including at least one date; referring to a user-defined rule set, wherein the rule set includes at least a date offset function; and applying modifications to the digital source document according to the user-defined rule set, so as to anonymize the digital source document, the modifications including changing the least one date to a different date in accordance with the date offset function; and saving the digital source document with the modifications as an output document.

BRIEF DESCRIPTION OF THE DRAWINGS

The invention may be best understood by reference to the following description taken in conjunction with the accompanying drawing figures, in which:

FIG. 1 is a view of an example source document;

FIG. 3 is a sample marked-up document;

FIG. 4 is a sample final output document;

FIG. 6 is an exemplary display of document edit information for review.

DETAILED DESCRIPTION OF THE INVENTION

Figure 2:
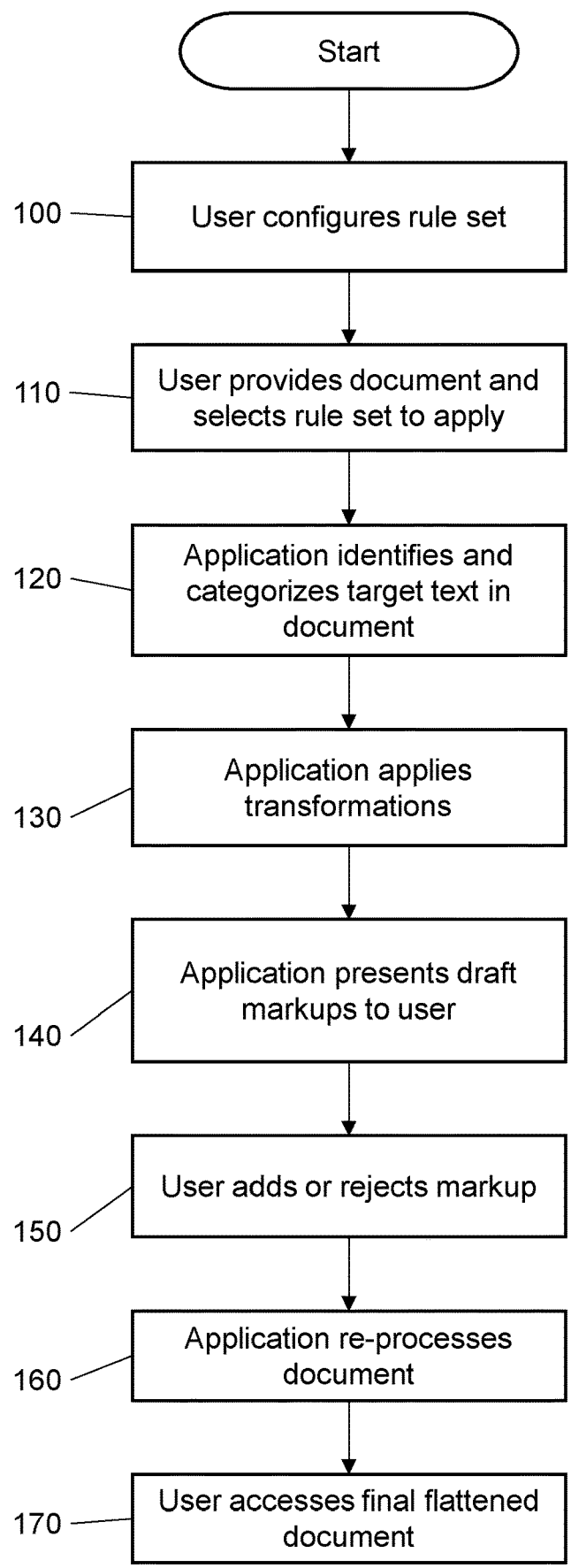
FIG. 2 is a block diagram illustrating an overall document anonymization process.

Described herein is a method and a software application for its implementation. The application is operable to receive a source document as text input, apply modifications to the document according to a user-defined rule set, and produce an output document. The application includes, among other possible anonymizations, a date offset function.

This function identifies all date values in written text that are associated with a particular subject (person) and shifts them all by a consistent value (the "offset value"). The purpose of doing this is to anonymize the text so that the subject cannot be personally identified by a reader who may have background information about a given subject's clinic visits, medical events, or other dates. One potential use of the application is for clinical study documents, but this concept can be applied to any document where personally-identifying information must be removed, masked, or anonymized.

The offset value is calculated so that the first encounter with every patient aligns with the same date (the "anchor date"), typically a single milestone, such as an overall study start date, which is consistent throughout the document. To preserve data utility, all other dates for a given subject are shifted by the same value, and therefore the time elapsed between events remains consistent between the original and transformed text. Since the offset value is different for each subject, each date value is associated to a subject prior to any transformation.

The steps of the method described herein may be carried out on one or more electronic processors operably coupled to suitable electronic memory. It will be understood that the method may be carried out entirely using processors contained within a single computing device, or entirely using processors contained external to the computing device, or by some combination of the two.

In one implementation, the application may be embodied as a stand-alone (e.g. on a local computer) and the source and output documents may be saved on the local computer.

In another implementation, the application may be hosted on one or more network-connected computers (e.g., servers).

The source document may be transferred to a server (i.e., "uploaded") where it is processed, and the output document may then be transferred to the local computer (i.e., "downloaded"). The application processing may be spread amongst multiple network-connected computers, i.e., it may be implemented as a "cloud" service.

The application may be embodied as one more non-transitory computer readable media having stored thereon a plurality of instructions that, when executed by one or more processors of a system, causes the one or more processors to carry out the method steps described herein.

FIG. 1 illustrates an example source document 10. The source document 10 is an electronic file which is stored as digital data in a suitable storage device such as magnetic media, optical media, or solid-state media. More specifically, the source document 10 contains data in a text format, e.g., a series of characters representing letters, spaces, and punctuation. Numerous open-source and proprietary text document formats are known in the art.

The specific example source document 10 contains two paragraphs, the first one describing activities relating to first subject ("ABC-123") and the second paragraph describing activities relating to a second subject ("ABC-456").

The source document 10 includes several dates which can be written out in varying formats, e.g. "Feb. 1, 2018" and "2/15/2018". As noted above, the sequence of actual dates might tend to reveal the identity of a subject.

The source document 10 contains only text and is not indexed or stored in a database format. In other words, the source document 10 need not contain any formatting, tags, or metadata inherently associating the dates to the subjects.

FIG. 2 illustrates an overall document anonymization process. Initially (block 100), a user interacts with the application to create a rule set. This may be done, for example, by interacting with application menus (not shown) or by creating a configuration file containing the rule set.

The rule set may include numerous anonymization rules including, for example, name, address, race, age, gender, and/or geographic locations. Each type of personally-identifiable information included in the rule set would be deleted, obscured, or replaced with a substitute value by the application. Additionally, the rule set includes an "anchor date", described in more detail below, used for the date offset process. As an additional feature, the user can optionally identify specific dates which should be excluded from the offset rule. For example, the document might reference study-level milestones which should not be shifted or associated with any subject. In a similar vein, the user can identify document pages which should be excluded by this rule, e.g. pages that do not contain subject-specific information.

Within the rule set, the user configures a rule that defines how subject IDs are identified (often, subject IDs are also transformed and so there is a dedicated "subject ID rule" for them). Some examples are format-based (e.g. XXX-###-XXX to find ABC-123-XYZ) or a lookup, i.e. matching strings found in the text against a list of known subject IDs. A lookup can pull from sources such as: a configured list, an imported spreadsheet, or a stored dataset.

Within the offset rule, the user must define one preexisting rule within the same rule set, which is to be considered the "subject ID rule", for the purpose of the offset algorithm.

Next (block 110), the user inputs or identifies a source document 10 such as the one shown in FIG. 1, for example by uploading the source document 10 to a specified server location, and selects a rule set to be applied to the source document 10.

At block 120, the application identifies and categorizes target text in the source document, and applies transformations, including date offsets. Applying an offset rule, a date offset process identifies all date values in written text that are associated with a particular subject and shifts them all by the offset value, replacing the original dates in the document with the offset dates. Table 1 below shows an example for Subject ABC-123 in the source document 10. In this example, the designated anchor date is Jan. 1, 2018. The earliest occurring original date in the document associated with Subject ABC-123 is Feb. 1, 2018. This results in an offset value of 31 days. Accordingly, every date value is offset by 31 days.

TABLE 1

| computed offset dates | |
| --- | --- |
| original date | offset date |
| Feb. 1, 2018 | Jan. 1, 2018 |
| Feb. 15, 2018 | Jan. 15, 2018 |
| Mar. 1, 2018 | Jan. 29, 2018 |
| Mar. 15, 2018 | Feb. 12, 2018 |
| Mar. 31, 2018 | Feb. 28, 2018 |
| Apr. 15, 2018 | Mar. 15, 2018 |
| Apr. 30, 2018 | Mar. 30, 2018 |

Figure 5:
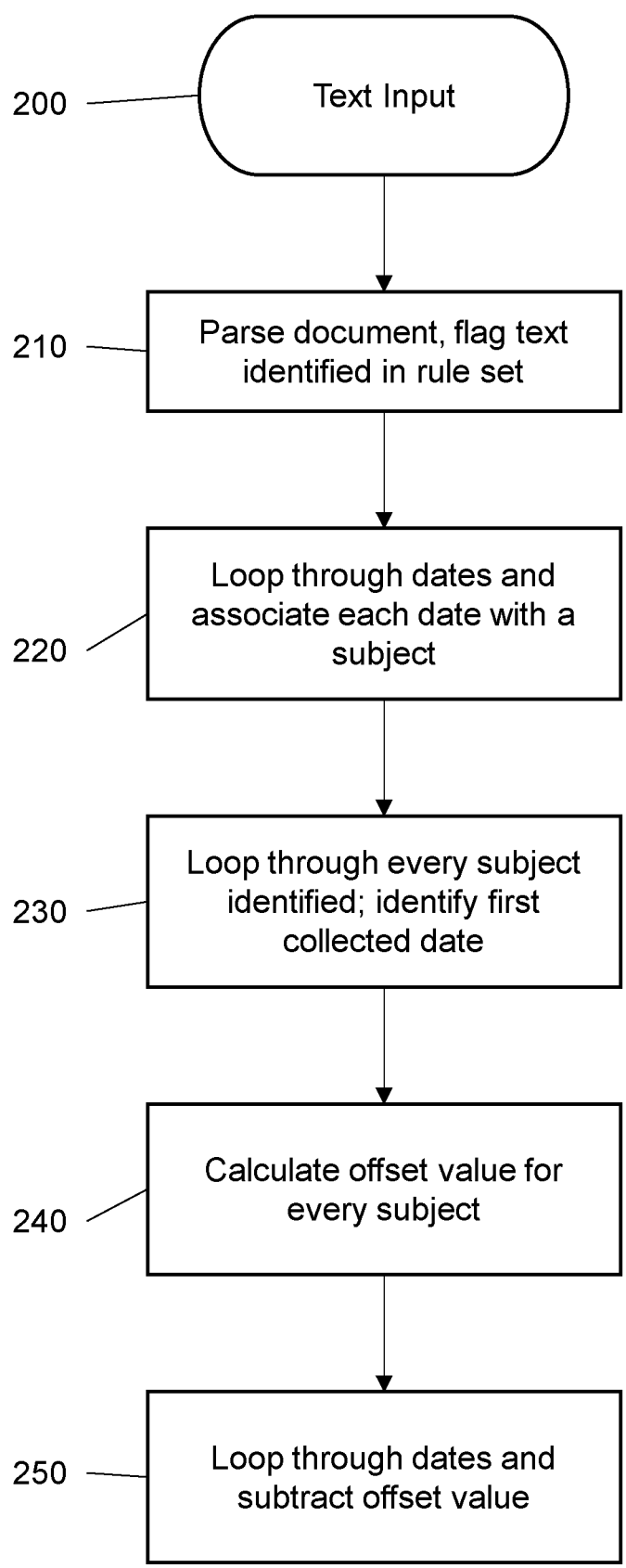
FIG. 5 is a block diagram illustrating a date offset process flow.

The date offset process is described in more detail below with reference to FIG. 5.

Next, block 130, the application presents a draft document to the user in markup format. For example, the proposed changes may be depicted in strikethrough/underline format, as an accompanying reference list, or via mouse hover ("tooltip") functionality in the application's user interface. An example markup document 12 is shown in FIG. 3.

At block 140, the user reviews the proposed markup and may accept the markup or reject it in whole or in part. The user may make additional markups. During this time, the user can access a screen (display) that presents information organized specific to the offset rule only. It groups information by subject, presents the anchor date, first date observed, offset value, and all the original and anonymized dates. It is often more useful to review in this manner as opposed to reading through the text itself. An example review display is shown in FIG. 6.

At block 150, the user indicates to the application that markups are complete.

At block 160, the application saves the document as a final document in which all layers of the document have been merged into one, so there is no way to access or view the underlying/hidden layers (i.e., the ones that would contain the original text in a non-flattened, multi-layered version). Stated another way, all information that is not intended to be viewed is deleted. This may be referred to as a "flattened" document. FIG. 4 illustrates an example output document 14.

Finally, block 170, the user can save or download a local copy of the flattened final document 14. The final document 14 is available for further use with increased confidence that the subjects can not be identified. The date offset process removes personally identifiable information while still maintaining the intervals between individual dates. This information may have significance and clinical utility.

As noted above, the text of the source document 10 does not explicitly define which subject a date applies to, when the first encounter with a subject took place, or what the offset value should be. Therefore, the application employs an algorithm to analyze text and determine which subject a date should be associated with, by searching for previous instances of subject identifiers. It also identifies the earliest date in text associated with a single subject for use in the calculation of the offset value. This process may be better understood with reference to FIG. 5.

In block 200, text input is received from the source document 10 as described above.

Block 210, the application parses the source document, and flags and categorizes all text that is identified by any rule in the rule set. This includes subject IDs, as defined in the subject ID rule, as well as dates to be used for the offset.

Next (Block 220) the application loops through every date identified. For every date, if any preceding text is a match for the subject ID rule, that date is associated with the most recent subject ID. (If no preceding text matches subject ID, the date is not associated with a subject and not transformed).

At Block 230, the application loops through every subject ID identified. For every subject with associated dates, it identifies the earliest date and defines that date as the "first collected date" for that particular subject.

Next, Block 240, the application calculates the offset value for every subject by subtracting the anchor date from that subject's first collected date.

Then, at Block 250 the application loops through every date identified. For every date, it subtracts the associated subject ID's offset value to calculate the anonymized date (i.e., replacement date).

The process described above has the advantage and technical effect of removing personally identifiable information while still maintaining the intervals between individual dates. This transformation automatically associates dates with subjects, without requiring the user to define this association upfront.

The foregoing has described a method for document anonymization including date offsetting. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of anonymizing a digital document, comprising:
   receiving a digital source document containing text including multiple dates;
   referring to a user-defined rule set, wherein the rule set includes at least a date offset function and designates an anchor date;
   analyzing the text of the digital source document to identify subject-related dates and associating each with at least one of a plurality of subjects;
   for each subject, identifying an earliest date among the dates associated with the subject;
   applying modifications to the digital source document according to the user-defined rule set, so as to anonymize the digital source document, the modifications including changing the multiple dates to different dates in accordance with the date offset function;
   wherein the modifications include, for each subject:
      calculating an offset value by subtracting the anchor date from the earliest date;
      modifying the digital source document to replace the earliest date with the anchor date;
      for every other date associated with the subject, subtracting the offset value from the date to calculate a corresponding different date; and
      modifying the digital source document to replace each other date associated with the subject with the corresponding different date;
   providing a summary display option whereby at least the anchor date, the offset value, each original date, and each modified date are displayed for each subject; and
   saving the modified digital source document as an output document.

2. The method of claim 1, wherein the digital source document includes information relating to two or more human subjects and includes multiple dates for each of the two or more human subjects.

3. The method of claim 2, wherein:
   the digital source document includes a unique subject ID corresponding to each of the two or more human subjects;
   the rule set includes a subject ID rule that defines how the subject IDs are identified; and
   analyzing the text of the digital source document includes for each identified date, if any preceding text is a match for the subject ID rule, associating that date with the most recent subject ID.

4. The method of claim 1, wherein:
   the digital source document is received at a specified computer server or group of computer servers which carries out the steps of referring, applying and saving; and
   the output document is transferred over a data network to a remote computer.

5. A computer system for processing documents, comprising:
   a memory; and
   an electronic processor coupled to the memory and operative to perform the operations of:
      receiving a digital source document containing text including multiple dates;
      referring to a user-defined rule set, wherein the rule set includes at least a date offset function and designates an anchor date;
      applying modifications to the digital source document according to the user-defined rule set, so as to anonymize the digital source document, the modifications including changing the multiple dates to different dates in accordance with the date offset function;
      wherein the modifications include:
         calculating an offset value by subtracting the anchor date from an earliest date of the multiple dates;

modifying the digital source document to replace the earliest date with the anchor date;

for every other date identified, subtracting the offset value from the date to calculate a corresponding different date; and modifying the digital source document to replace each other date with the corresponding different date;

providing a summary display option whereby at least the anchor date, the offset value, each original date, and each modified date are displayed; and saving the modified digital source document as an output document.

6. The system of claim 5, wherein the digital source document includes information relating to two or more human subjects and includes multiple dates for each of the two or more human subjects.

7. The system of claim 6, wherein:

the digital source document includes a unique subject ID for each of the two or more human subjects;

the rule set includes a subject ID rule that defines how the subject IDs are identified; and the operations include, prior to the step of changing the at least one date:

parsing the digital source document to identify dates; and for each date, if any preceding text is a match for the subject ID rule, associating that date with the most recent subject ID.

8. The system of claim 5, wherein:

the digital source document is received at the processor; and the output document is transferred over a data network to a remote computer.

9. A computer program product comprising one or more non-transitory computer readable media having stored thereon a plurality of instructions that, when executed by one or more processors of a system, causes the one or more processors to carry out a method including:

receiving a digital source document containing text including multiple dates;

referring to a user-defined rule set, wherein the rule set includes at least a date offset function and designates an anchor date;

applying modifications to the digital source document according to the user-defined rule set, so as to anonymize the digital source document, the modifications including changing the multiple dates to different dates in accordance with the date offset function;

wherein the modifications include:

calculating an offset value by subtracting the anchor date from an earliest date;

modifying the digital source document to replace the earliest date with the anchor date;

for every other date identified, subtracting the offset value from the date to calculate a corresponding different date; and modifying the digital source document to replace each other date with the corresponding different date:

providing a summary display option whereby at least the anchor date, the offset value, each original date, and each modified date are displayed; and saving the digital source document with the modifications as an output document.

10. The computer program product of claim 9, wherein the digital source document includes information relating to two or more human subjects and includes multiple dates for each of the two or more human subjects.

11. The computer program product of claim 10, wherein:

the digital source document includes a unique subject ID for each of the two or more human subjects;

the rule set includes a subject ID rule that defines how the subject IDs are identified; and the method includes, prior to the step of changing the at least one date:

parsing the digital source document to identify dates; and for each date, if any preceding text is a match for the subject ID rule, associating that date with the most recent subject ID.

12. The method of claim 1, further comprising, prior to saving the modified digital source document as an output document, generating a markup for user review to identify modifications made to the digital source document.

13. The method of claim 12, further comprising, prior to saving the modified digital source document as an output document, accepting user approval of the identified modifications.

14. The system of claim 5, wherein the electronic processor further performs the operations of, prior to saving the modified digital source document as an output document, generating a markup for user review to identify modifications made to the digital source document.

15. The system of claim 14, wherein the electronic processor further performs the operations of, prior to saving the modified digital source document as an output document, accepting user approval of the identified modifications.

16. The computer program product of claim 9, wherein the method further includes, prior to saving the modified digital source document as an output document, generating a markup for user review to identify modifications made to the digital source document.

17. The computer program product of claim 16, wherein the method further includes, prior to saving the modified digital source document as an output document, accepting user approval of the identified modifications.

* * * * *